April 18, 1944.  S. B. WINN  2,346,888
TRACTOR-TRAILER COMBINATION
Filed Nov. 4, 1942  4 Sheets-Sheet 1

Inventor
Sidney B. Winn
By Barthel & Bugbee
Attorneys

Patented Apr. 18, 1944

2,346,888

UNITED STATES PATENT OFFICE 2,346,888

TRACTOR-TRAILER COMBINATION

Sidney B. Winn, Lapeer, Mich.

Application November 4, 1942, Serial No. 464,477

14 Claims. (Cl. 280—33.1)

The present invention relates to improvements in tractor trailer combinations and more particularly to a tractor trailer coupling element.

The primary object of the invention is to provide a tractor trailer assembly with a coupling element which may be locked against accidental displacement and simultaneously to provide means to insure the lowering of the trailer prop when the coupling is disconnected and the tractor is moved forwardly from under the front end of the trailer.

Another object of the invention is to provide a tractor trailer assembly having a coupling element in the form of a fifth wheel which fifth wheel is provided with a locking device operable upon movement of the tractor toward and away from the trailer whereby release of said locking element may be effected upon the forward travel of the tractor after the release of suitable latch means.

Another object of the invention is to provide a tractor trailer assembly having means for locking the coupling element independent of the coupling jaws whereby said tractor and trailer assembly will be prevented from being separated upon failure of the coupling element or the cooperating jaws therefor.

Another object of the invention is to provide a tractor trailer assembly of the above mentioned character having a locking element independent of the component tractor and trailer elements which is automatically shifted from its inoperative to its operative position when the tractor is backed into engagement with the trailer to effect a coupling thereof thereby insuring the automatic operation of the independent locking member and preventing damage to the trailer in the event that the tractor is pulled away from the trailer before engagement of the component coupling elements.

Another object of the invention is to provide a tractor trailer assembly wherein the trailer is provided with a novel supporting prop which is automatically lowered when the tractor and trailer are separated so as to prevent possible damage to the trailer during uncoupling of the trailer with respect to the tractor.

Another object of the invention is to provide a locking device for a tractor trailer assembly which is positive in operation and which is provided with means for preventing accidental displacement of the locking member when the tractor and trailer are in their coupled relation.

Other objects and advantages of the invention will become apparent during the course of the following description of the accompanying drawings wherein.

General description of the invention

The invention broadly comprises a tractor and trailer assembly coupling in which one of the component coupling elements is mounted in a slide movable to and fro in the forward portion of the trailer whereby said slide may be locked against movement by suitable latch means independent of the jaw latching means of the tractor trailer coupling so that when the component coupling elements are in engagement, relative movement will be permitted between the tractor and trailer when the slide latching means is out of engagement with the slide. Further, the invention comprises a protectable prop for the trailer which is connected to the slide so that the relative movement between the trailer and tractor will cause the projection of the prop during uncoupling of the tractor and trailer.

Means is provided for locking one of the component coupling elements to the other coupling element to prevent accidental displacement of the tractor and trailer assembly and said means is governed by the backward and forward movement of the slide during coupling and uncoupling operations so that during uncoupling the locking means will be moved to released position while during coupling the locking element will be moved to a locking position and simultaneously, such movement of the slide will effect the projection and retraction of the trailer prop.

The invention provides means cooperating with the locking element for preventing vertical movement thereof when the trailer and tractor are in coupled relation by the engagement of the component coupling elements and said cooperating means includes a roller which is directly positioned for holding the locking element in its operative position when the tractor and trailer are coupled. Upon release of the slide latch means the tractor and trailer may be separated a predetermined distance so that the trailer prop will be projected or lowered before separation of the component coupling elements.

It is to be noted that various forms of the invention operate to the same end and in all of the modified forms shown the prop operating slide is substantially identical, the differences in detail reside in various forms of the locking elements carried by the slide to prevent accidental displacement or separation of the tractor and trailer in the event that one of the component coupling elements should become sheared or broken.

Detail description of the invention

In the drawings wherein for the purpose of illustrating the invention in detail and wherein like reference characters will be employed to designate like parts throughout the same, attention is first directed to Figures 1 to 11, inclusive, wherein is shown a preferred embodiment of the invention as applied to a tractor trailer combination.

The invention includes a tractor truck 10 comprised of a suitable chassis supported by rear wheels 11 attached to the chassis by a spring suspension means 12. The tractor chassis 10 comprises a pair of side channel frames 13 connected at the rear by a cross channel frame 14, the forward portion of the tractor is broken away but it is understood that the same includes the cab and power unit therefor.

A trailer generally designated by the reference character 15 is adapted to be coupled to the tractor 10 in a manner which will hereinafter be more fully described so as to provide a tractor trailer combination of commercial form.

The trailer 15 includes a pair of spaced side frame bars 16 of channel formation which are connected at the front by means of a curved bow-shaped section 17 to provide a relatively rounded contour chassis at the front end for supporting a streamlined trailer body. The rear portions of the side channel chassis bar 16 are connected by a cross channel bar 18 and interposed between the curved portion 17 and rear channel bar 18 is a series of auxiliary cross channel bars, as at 19, 20 and 21, the ends of which are welded between the flanges of the channel-shaped chassis bars 16 thereby strengthening the chassis throughout its length and in addition providing supporting means for other structural features of the trailer. The channel shaped chassis frame bars 16 are offset as at 22 adjacent the rear portion of the chassis and said rear portion is supported by trailer wheels 23 suspended from the chassis 15 by means of a suitable spring suspension system 24.

Connecting the side chassis bars 13 of the tractor 10 is a plate-like platform 25 which is adapted to support a pair of spaced trunnion brackets 26 of identical formation. The base of each bracket, as at 27, is provided with ears through which extend bolts or other fastening means for the purpose of anchoring the bracket 26 in position. Each of the brackets 26 is provided with a pair of spaced webs 29 for receiving correspondingly spaced lugs 30 formed on the tiltable fifth wheel platform 31. Bolts 32 extend through the webs 29 and depending lugs 30 for rockingly retaining the fifth wheel platform 31 in position. Nuts or the like, as at 33, may be threaded on the bolts 32 to prevent displacement of the fifth wheel turn table.

The fifth wheel turn table is provided with a rounded front portion 34 and a bifurcated rear portion 35 having the walls thereof cut away as at 36 to provide a U-shaped slot terminating at its inner end in a circular opening 37. Intermediate the inclined wall 36 and the circular opening 37 is a restricted portion 38 providing an entrance slot communicating with the circular opening 37 for receiving and guiding the king pin or other component truck element into position. The rear portion 35 of the tiltable turn table 31 is slidably tapered and inclined rearwardly and downwardly to assist in elevating the trailer during the coupling operation. The marginal edge of the turn table 31 is provided with a downwardly extending flange 39 to add rigidity thereto and prevent bending or distortion thereof.

The underside of the tiltable fifth wheel platform is provided with a stirrup 40 the ends of which are integrally connected to the underside of the fifth wheel platform as at 41 and said stirrup 40 forms a support for a pair of pivot pins 42 which extend through the platform and stirrup and provide pivot means for supporting a pair of cooperating coupling jaws 43. Each of the jaws 43 is provided with a cut-away portion 44 to receive the other coupling element or king pin and lock the same in position when the jaws 43 are closed. The opposite ends of the jaws 43 are notched as at 45 for receiving a sliding locking bolt 46 which is adapted to be guided against the underside in a rounded boss 47 having a reduced portion 48 operable within a slot 49 formed in the bolt 46. A machine screw or the like as at 50 is adapted to retain the sliding bolt 46 in position and a washer 51 engages the underside of the locking bolt to prevent displacement thereof. The opposite end of the locking bolt 46 is provided with an angular end portion 52 upon which is formed a guide pin 53 guided in an opening 54 in the depending flange 39. A coil spring 40a is interposed between the flange 39 and the enlarged angular portion 52 of the bolt 46 to normally urge the bolt into engagement with the notches 45 thereby closing the jaws 43 and locking the same against displacement or separation. A manual operating lever 55 has its inner end secured to an arm 56 of a bell crank which is pivoted as at 57 to the underside of the tiltable fifth wheel platform 31. The other arm of the bell crank 58 is connected to the sliding bolt 46 by means of a pivot pin 59. The manual control lever 55 is provided on its outer end with a handle 60 which may be readily grasped by the operator to effect the uncoupling or separation of the tractor and trailer by retracting the sliding bolt 46 to allow the separation of the jaws 43 during uncoupling operations.

It is to be noted that the stirrup 40 is located substantially beneath the circular opening 37 in the tiltable fifth wheel platform 31 and is spaced therefrom a sufficient distance to allow the free operation of the coupling jaws 43. Likewise it is to be noted that the cut-away portions 44 of the jaws 43 form a circular opening when closed in concentric alinement with the opening 37 in the tiltable fifth wheel platform.

Figures 6, 7, 8, 9, 10, 11:
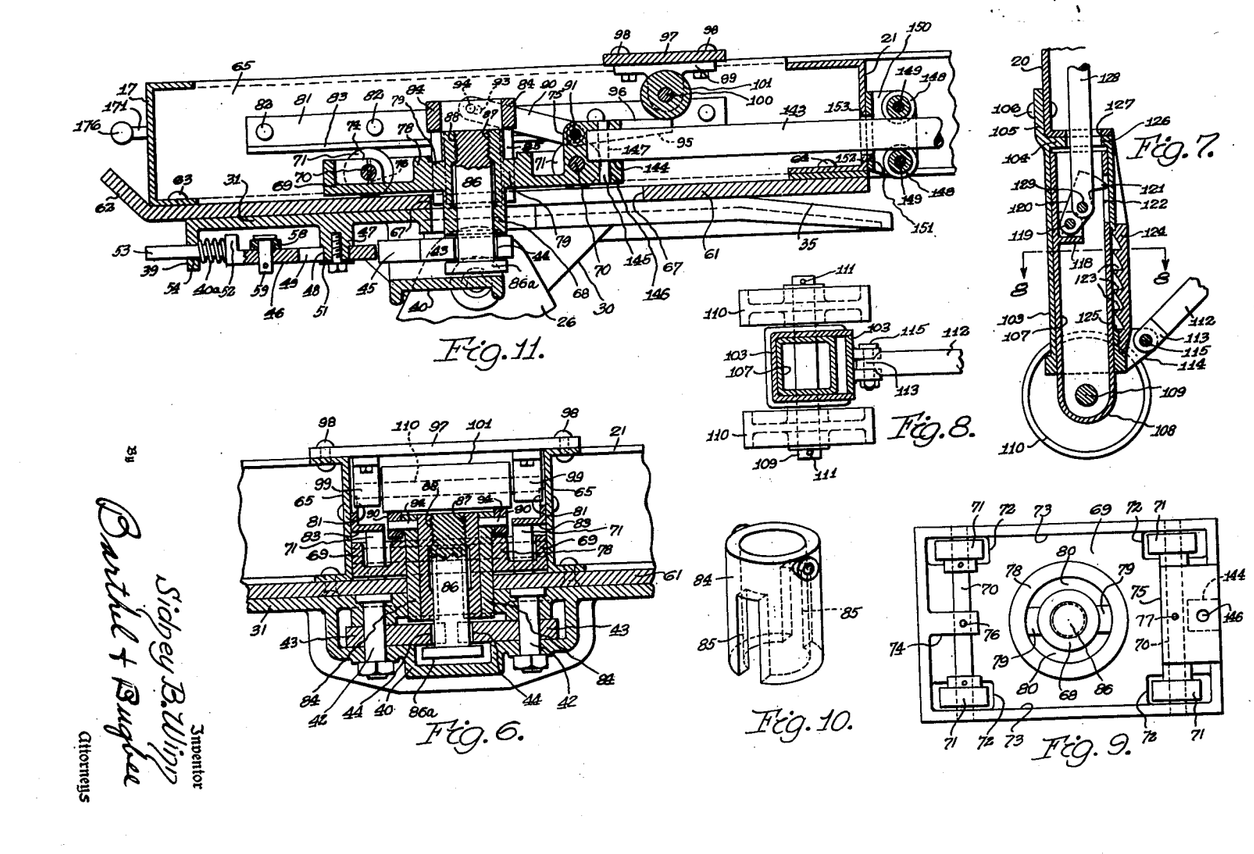
Fig. 6 is a vertical cross sectional view taken on line 6—6 of Fig. 4 looking in the direction of the arrows illustrating in detail the automatic component coupling element lock and showing the manner in which the prop operating slide is associated therewith.
Fig. 7 is a longitudinal sectional view of the retractable prop illustrating in detail the latch means for maintaining the prop in its projected trailer supporting position.
Fig. 8 is a horizontal cross sectional view taken on line 8—8 of Fig. 7 looking in the direction of the arrows illustrating the general contour of the prop and showing the manner in which the supporting wheels are secured thereto.
Fig. 9 is a top plan view of the prop operating slide illustrating the same moved from the trailer to show in detail the manner in which one of the component coupling elements is supported thereby.
Fig. 10 is a perspective view of the locking slide which is automatically raised and lowered and which is adapted to be interposed between the coupling element and the slide.
Fig. 11 is a longitudinal sectional view similar to Fig. 4 illustrating the location of the slide and locking member when the tractor is being separated from the trailer.

The trailer chassis 15 has its front end provided with a wear plate 61 welded or otherwise secured to the underside of the chassis and extending from the transverse frame bar 21 well beyond the curved front wall 17 of the chassis where it terminates in an upturned flanged portion 62. As shown in Figure 11, rivets or the like 63 are provided for fastening the wear plate in place and similar rivets 64 connect the rear edge of the wear plate with the transverse chassis frame bar 21. In order to strengthen and reenforce the forward portion of the trailer chassis frame adjacent the coupling area, a pair of central reenforcing bars 65 are arranged in parallel relation and have their ends received between the flanges of the channel members 17 and 21 so that they may be welded thereto. On opposite sides of the central reenforcing bars 65 are similar angle irons 66 which extend between the channel frame members 17 and 21 in parallel relation with the central bars 65 so that they may be likewise welded in position. It is to be noted that the angle bars 66 extend along the marginal edges of the wear plate 61 and said bars may be welded thereto to complete the structure. The wear plate 61 is provided with an elongated slot 67 centrally formed therein for allowing free sliding movement of a king pin sleeve 68 which is supported and carried by a slide plate 69 movable to and fro on the top surface of the wear plate 61. The sliding plate 69 is of rectangular formation and is provided adjacent each end with axles 70 on the ends of which are mounted supporting wheels 71 so that the wheels will extend through opening 72 in the slide plate 69. As best illustrated in Figure 9, the slide plate 69 is provided with a marginal flange 73 having formed integral therewith opposed bosses 74 and 75 through which the axles 70 pass so that the retaining pins 76 and 77 may anchor the axles in position. It is to be noted that the central portion of the slide plate 69 is provided with an annular enlargement 78 and that the king pin supporting sleeve 68 is spaced upon the annular enlargement 78 by spider arms 79 thereby providing an interrupted circular opening 80 therebetween.

It is intended to guide the slide plate 69 between the parallel reenforcing channel irons 65 as is shown best in Figure 6 and it will be readily seen that the reenforcing channel irons 65 are spaced substantially the same distance as the width of the slide plate so that the upturned marginal flange 73 along the longitudinal sides thereof will engage the reenforcing channel irons 65. Secured to the opposed wall of the channel irons 65 is a guide rib 81 fastened in place by rivets or the like as at 82 and each of the guide ribs is provided with an inwardly directed flange 83 for engaging the wheel 71 to retain the wheel and the slide plate in position against vertical movement but allowing free longitudinal sliding movement during uncoupling operations.

Slidably carried by the king pin supporting sleeve 68 is a locking sleeve 84 which is preferably formed cylindrical and is provided in a side wall with opposed longitudinal slots 85 for receiving the spider arms 79 whereby said locking sleeve 84 may be reciprocated to extend downwardly into the circular opening 37 of the tilted turntable 31 when the trailer-tractor combination is coupled. A king pin 86 has its upper end as at 87 threadedly received in a correspondingly threaded reduced opening 88 in the king pin supporting sleeve 68 and said king pin 86 projects downwardly through a central opening 89 in the king pin supporting sleeve so that the lower end will project into the path of the coupling jaws 43. The extreme free end of the king pin 86 is provided with flanged head 86a to prevent vertical movement of the king pin when coupled with the jaws 43. It will be readily observed that when the coupling jaws 43 and king pin 86 are in coupled relation and the locking sleeve 84 in its lowermost position, that uncoupling of the tractor and trailer will be prevented should the king pin 86 or coupling jaws 43 become disengaged.

Means is provided for automatically raising and lowering the locking sleeve 84 and comprises a pair of rock levers 90 having their intermediate portions supported by a spindle 91 carried by the enlarged boss 75. Cotter keys or the like as at 92 are provided for retaining the rock levers 90 on each end of the spindle 91. One end of each of the levers is provided with a slot 93 for receiving a pin 94 on each side of the locking sleeve 84 so that the other end of the rock lever when tilted will cause the vertical movement of the locking sleeve 84 and its resultant release from the opening 37 in the tiltable turntable platform 31. It is to be noted that the free ends of the rock levers 95 are angularly formed so as to provide an inclined surface 96 when the opposite end of the lever 90 is in a horizontal position.

Extending transversely of the central reenforcing bars 65 is a roller supporting plate 97 secured in place adjacent each end by rivets or the like as at 98 extending through the flanges of the channel-shaped reenforcing bars 65 as is clearly shown illustrated in Figure 6. Depending from the roll-supporting plate 97 is a pair of roller-supporting brackets 99 having suitable openings for receiving a spindle 100 on which is located and rotatably mounted a roller 101. When the slide plate 69 is moved forwardly and rearwardly, the roller 101 cooperates with the inclined surface 96 of the rock lever 90 to tilt the same from the position shown in Figure 2 to the position shown in Figure 11, and it is to be noted that in the former position the slide 69 is moved so that the locking sleeve 84 is at the extreme rear end of the slot 67 and in the latter position is at the extreme forward end of the slot 67. When the slide plate 69 and locking sleeve 84 are in their rearmost position relative to the slot 67, the roller 101 engages the rock levers 90 and retains the locking sleeve 84 in its operative position against vertical accidental movement by jarring or the like as clearly shown in Figure 4.

*Trailer prop structure*

Figure 2:
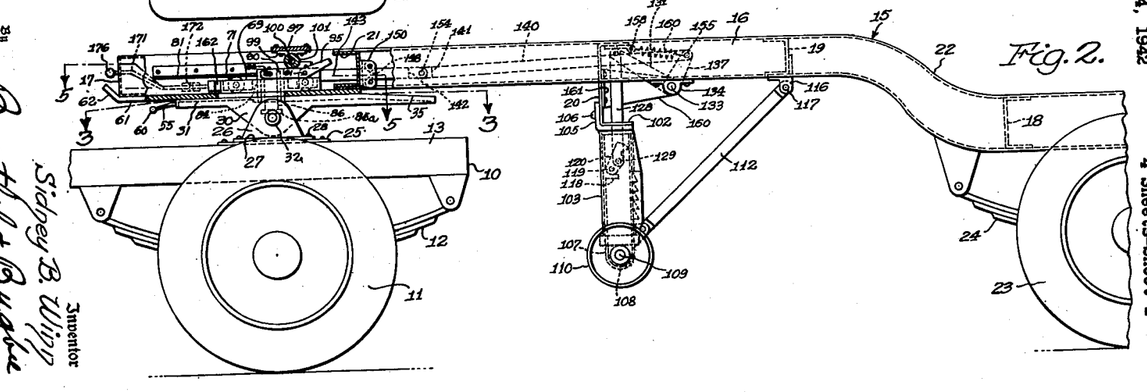
Fig. 2 is a side elevational view of the same and is broken away to illustrate in detail structural features of the component coupling elements and the lock therefor.
Figure 3:
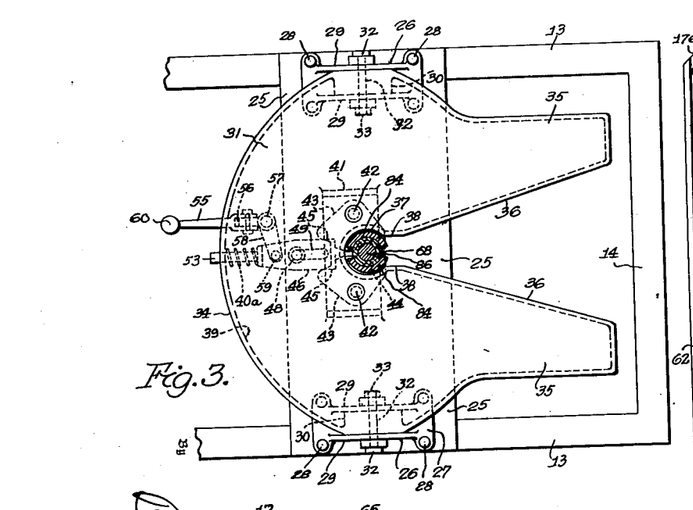
Fig. 3 is a horizontal cross sectional view taken on line 3—3 of Fig. 2 looking in the direction of the arrows illustrating the tractor turntable platform and the manner in which the cooperating coupling element is locked in position thereon.
Figure 4:
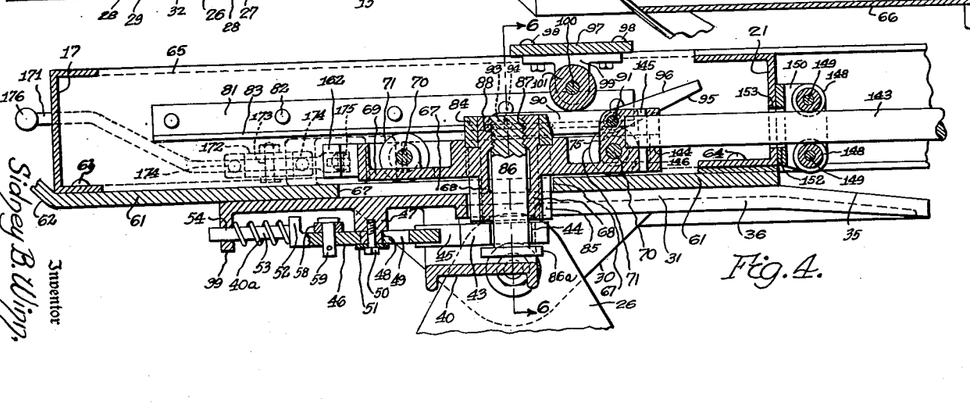
Fig. 4 is a longitudinal cross sectional view greatly enlarged and taken on line 4—4 of Fig. 1 looking in the direction of the arrows further illustrating in detail the automatic component coupling element locking member and showing the prop operating slide.

The transverse chassis frame bar 20 is of increased width so that the lower flange thereof as at 102 extends a considerable distance beneath the chassis frame 15 as is clearly shown illustrated in Figure 2. Supported by the flange 102 is a trailer prop housing 103 the upper end of which is closed by an end wall 104 having a bracket extension formed integral therewith as at 105. The bracket extension is riveted or otherwise secured to the web of the channel member 20 by means of bolts or rivets 106. The lower end of the prop housing 103 is open for allowing the passage and projection of a trailer prop 107 which is slidably mounted within the housing 103 and is retractable against the action of gravity. The lower portion of the prop 107 is finished as at 108 and extending through the lower portion is an axle 109 on the ends of which are positioned ground wheels 110. Cotter keys or the like 111 extend through openings in the axle to prevent displacement of the ground engaging wheel. It is to be noted that the prop housing 103 and props 107 at each end of the transverse channel frame member 20 are identical in formation and therefore only one has been described in detail. The prop housing 103 is adapted to be braced or otherwise reenforced and by way of example, a strut 112 is provided for each prop housing and has one of its ends as at 113 bolted to a lug or ear 114 on the lowermost end of the prop housing so that a bolt 115 may extend through the end 113 and lug 114 to securely anchor the strut in place. The upper end of each strut 112 is anchored to a bracket 116 welded or otherwise secured to the bottom flange of the channel-shaped transverse frame bar 19 and connection between the struts and brackets 116 is accomplished by means of anchor pins 117.

Formed integral with one of the inner walls of the prop 107 is a bracket 118 to which is pivoted as at 119 a latch bar 120. The free end of the latch bar is provided with a nose 121 adapted to project through an opening 122 in the opposite wall of the prop so as to engage a series of alined notches 123 when the prop is in its lowermost position. The notches 123 are formed in one of the walls 124 of the prop housing 103 which is of increased thickness and is positioned or fastened to the prop housing by suitable means so that the notches 123 are presented through an opening formed in the prop housing wall as at 125.

The upper closed wall of the prop housing is provided with an opening 126 which is in register with an opening 127 formed in the transverse channel frame bar 102 and in order to accommodate the prop at each side of the trailer, the chassis frame bar 102 is apertured adjacent each end as above mentioned to allow the projection of an operating rod 128 into the prop housing and into the prop so that the lower end of the operating rod 128 may be pivoted as at 129 to the intermediate portion of the latch bar 120.

The upper end of each of the operating rods 128 is connected to the bifurcated end 130 of a crank lever 131 which has its bearing portion 132 rigidly secured to a shaft 133, the ends of which are suitably journaled in bearing brackets 134 secured to the under flange of the side chassis frame bar 16. The hubs 132 of the crank lever 131 are rigidly secured in position by means of cotter pins or keys 135.

Secured to the intermediate portion of the shaft 133 and rigidly attached thereto is a lever hub 136 upon which is formed a lever arm 137. The lever arm is bifurcated as at 138 for receiving the rear reduced end 139 of a control rod 140 the opposite end of which is reduced as at 141 for being received between the bifurcated ends of a slide rod 143. The opposite end of the slide rod 143 is adapted to project into a bore 144 in the enlarged boss 75 of the slide plate 69 and is adapted to be locked therein by means of a transverse locking pin 145 extending through an opening 146 in the boss 75 and through an alined opening 147 in the end of the slide rod 143. The slide rod 143 is guided by means of a pair of guide rollers 148 having grooved peripheries for receiving the rod and said guide rollers are supported on pins 149 carried by a bracket 150. The base of the bracket as at 151 is welded or otherwise secured to the transverse channel frame bar 21 and said base is provided with an opening 152 in registry with an opening 153 in the channel frame bar 21 to allow the free passage of the slide rod 143 during the to and fro movements of the slide plate 69.

The slide rod 143 and operating rod 140 are connected by a pin 154 extending through the reduced portion 141 and the bifurcated portion 142 and the extreme rear end of the operating rod 140 has its reduced end 139 pivotally secured between the furcated arm 138 by means of an elongated pivot pin 155. Coil springs 156 have one of their ends connected to each end of the pivot pin 155 by being hooked thereover as at 157 and the opposite end of each of the coil springs 156 is anchored in position to a bracket 158 by being hooked in an eye thereof and said brackets are attached to the uppermost flange of the transverse channel frame member 20 so that the rod 128 will be urged downwardly in addition to being gravity biased. The downward movement of the rod 128 also forces the latch 120 into engagement with the notches 123 and holds the same therein after the prop has moved to the limit of its downward movement. The intermediate portion of the shaft 133 is additionally supported by means of brackets 160 having their flanges 161 bolted or otherwise riveted to the web of the channel frame member 20 so as to prevent bending of the shaft 133 by a direct pull on the operating rod 140. It is to be noted that the brackets 160 have been positioned on opposite sides of the lever arm 136 so that the shaft 133 will extend through the openings in the brackets and allow the ends of the brackets to lie closely against the end walls of the hub 136.

It will be readily seen that when the tractor and trailer are coupled by the interengagement of the component coupling elements that there will be relative movement between the tractor and trailer by reason of the fact that the king pin 86 is supported on the slide plate 69. The length of this movement will be determined by the length of the slot 67 in the wear plate 61 so that back and forward movement of the tractor with respect to the trailer will cause the slide plate to shift from one end of the slot 67 to the other. During this movement the locking sleeve lever 90 is raised and lowered and at the same time, the slide rod 143 is reciprocated so as to raise and lower the prop 107 and ground engaging wheels 110.

In order to lock the sliding plate 69 against such sliding movement when the tractor and trailer are in coupled relation for draft purposes, a locking member 162 in the form of a sliding bolt is reciprocably mounted in a guide 163 having a flanged base portion 164 riveted or otherwise secured as at 165 to one of the central reenforcing bars 65. The free end of the locking bolt 162 is adapted to project through an opening 166 in said longitudinal reenforcing bar so as to project into the path of the sliding plate 69 as is clearly illustrated in Figure 5. The opposite end of the locking bolt 162 is reduced as at 167 to provide a plunger slidably guided by a guide bracket 168 fastened in place by rivets or the like as at 169 extending through the wear plate 61 in such a manner as not to interfere with the contactual movement between the under surface of the wear plate 61 and the top surface of the tiltable turntable 31. A coil spring 170 surrounds the plunger 167 so that one end thereof abuts the bracket 168 while the opposite end abuts the enlarged sliding bolt 162.

The sliding bolt 162 may be retracted by means of a manual operating lever 171 pivotally attached to a bracket 172 as at 173. The bracket 172 has its base anchored in place by means of screws or the like extending therethrough and into one of the side reenforcing members 66. One end of the manual operating lever 171 is pivoted as at 175 to the plunger 167 so that oscillatory movement of the manual operating lever 171 will cause the sliding latch or bolt to be projected or retracted. A manual hand piece 176 is formed on the free end of the manual operating lever 171 to facilitate the grasping of the lever for controlling the action of the bolt 162. It is to be noted that the sliding latch 162 projects into the path of the sliding plate 69 when the sliding plate is rearwardly located with respect to the slot 67. In this position, the locking sleeve 84 is held in its lowermost position and the prop 107 is held in its uppermost position.

It is to be noted that the prop operating rod 140 projects through a suitable opening or slot in the web of the transverse channel frame bar 20 (not shown) so as to facilitate the slight oscillatory movement of the operating rod 140 during the reciprocation without causing any binding between the edges of the opening and the operating rod.

*Operation of the form of the invention shown in Figures 1 to 11 incl.*

Figure 1:
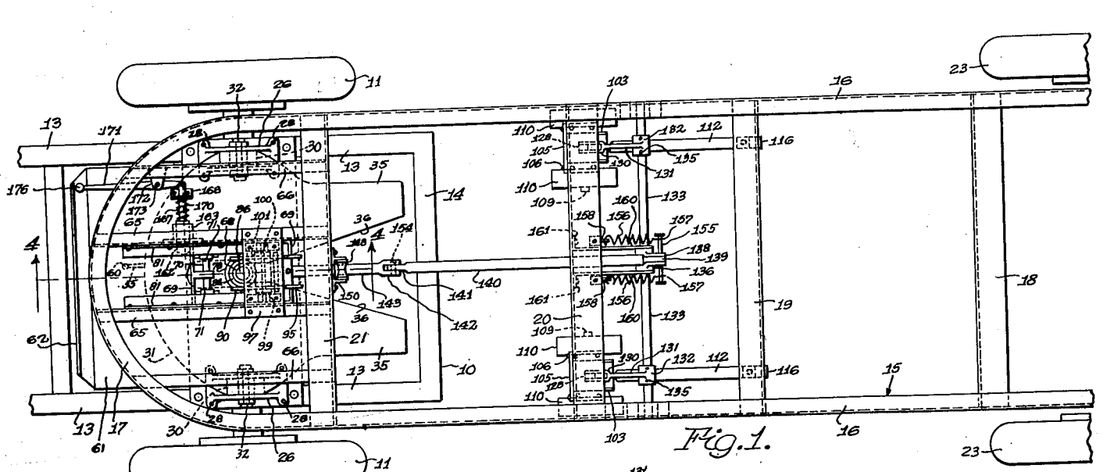
Figure 1 is a top plan view of a preferred embodiment of the invention illustrating a trailer and tractor assembly in coupled relation.
Figure 5:
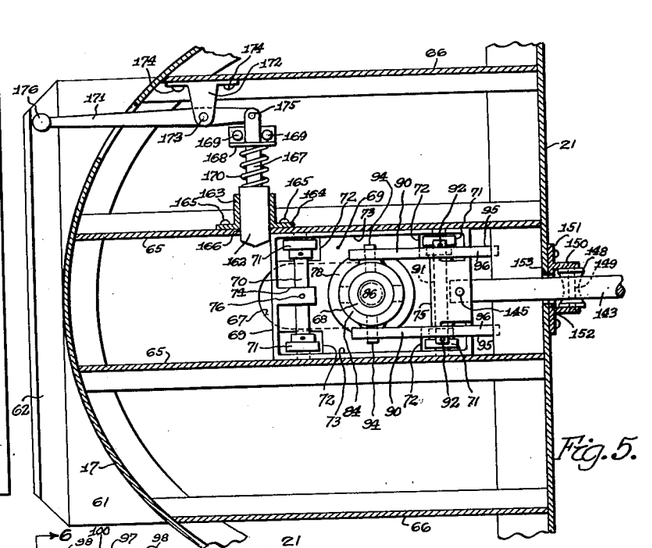
Fig. 5 is a horizontal cross sectional view taken on line 5—5 of Fig. 2 looking in the direction of the arrows illustrating in detail structural features of the invention and showing the latching means for the prop operating slide.

Since the tractor and trailer are shown in coupled relation in Figures 1 and 2, the operation will be described first for the uncoupling of the tractor-trailer combination. As shown in Figures 1 and 2, the component coupling elements including the jaws 43 and kingpin 86 are in engagement and the sliding plate 69 is held locked against movement by the locking bolt 162. In this position, the locking sleeve is held against vertical movement by the roller 101 engaging the control levers 90 so that the prop 107 is elevated and the wheels 110 are out of engagement with the ground. Should it be desired to uncouple the tractor from the trailer, the operator manipulates the manual handpieces 55 and 171 to cause the retraction of the bolts 46 and 162 from their positions as shown in Figure 5 to allow sliding movement of the slide plate 69 and the separation of the coupling jaws. After the latches have been thus released, the driver may manipulate the tractor to cause the sliding plate 69 to move forward with respect to the slot 67.

During this action, the end of each of the levers 95 will ride beneath the rollers 101 and cause the elevation of the locking sleeve 84 from the circular portion 37 of the slot 38 and simultaneously, such forward movement of the slide plate 69 will cause the slide rod 143 to move forward as well as the operating rod 140. Upon the forward movement of the operating rod 140, the crank arm 137 and shaft 133 are rocked counterclockwise to cause the crank arms 131 to move downwardly resulting in the lowering of the reciprocating rod 128 and the projection of the prop 107, so that the ground engaging wheels thereon will be lowered toward the ground and the prop will be held projected by the nose 121 of the latch 120 being received in one of the notches 123 after the weight of the trailer is supported by the prop.

After the tractor has been drawn away from the trailer a sufficient distance to cause the above operation to take place, continued further movement of the tractor away from the trailer will cause the jaws 43 to separate and allow the king pin 86 to travel rearwardly through the slot 38 and tapered slot 36 so that the front end of the trailer will eventually separate from the tractor and will be supported by the prop 107 after the tractor has cleared the trailer.

During the coupling operation, the tractor is moved rearwardly with respect to the trailer so that the king pin 86 will be guided by the inclined slot 36 to the reduced portion thereof as at 38 whereupon engagement of the king pin 86 with the jaws 43 will cause said jaws to close around the king pin. After the jaws and king pin have been coupled the latch 46 is projected to lock the same in coupled relation so that the driver may then continue to move the tractor rearwardly with respect to the trailer to cause the sliding plate 69 to likewise move rearwardly. As the sliding plate 69 moves rearwardly, the operating levers 90 of the locking sleeve are engaged by the roller 101 to thereby lock the sleeve in the opening 37 of the tiltable turntable platform 31. Simultaneously, the rod 143 is moved rearwardly to cause the shaft 133 to rotate in a clockwise direction thereby releasing the latch 120 during the initial portion of such movement so that continued movement of the slide rod 143 and operating rod 140 will cause the elevation of the prop 107. After the slide plate 69 has thus been moved rearwardly, to the limit of the slot 67, the spring 170 acts to project the bolt 162 into the path of the forward end of the slide plate 69, thereby locking the slide plate in position with the locking sleeve 84 held downwardly by the roller 101 and the prop 107 held elevated as shown in Figure 2.

It will readily be seen that should the operator of the vehicle be negligent he will be prevented from uncoupling the tractor and trailer by simply operating the handpiece 60 to allow the separation of the jaws 43 as it is impossible to separate the tractor and trailer before the prop is lowered. Should the operator attempt to uncouple by merely operating the handpiece 60, the locking sleeve 84 will maintain the tractor and trailer in coupled relation until the operating lever 171 is manipulated to release the sliding plate 69. On the other hand, should the operator only manipulate the control lever 171, the jaws 43 will still retain the king pin 86 so that uncoupling can not occur until both levers 171 and 55 have been manipulated to allow the release of the slide and the lowering of the prop.

*First modified form of the invention*

Figures 12, 13, 14, 15:
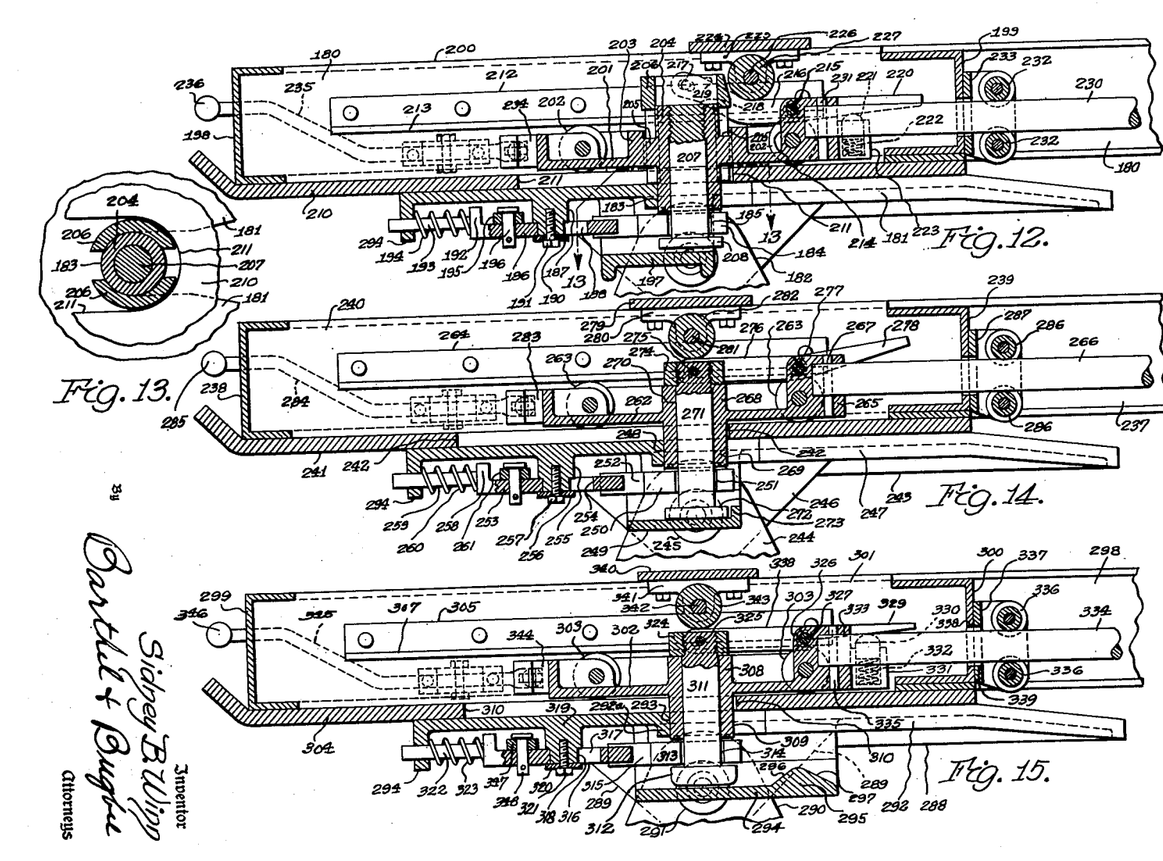
Fig. 12 is a longitudinal sectional view similar to Fig. 4 in a modified form of the invention showing a slightly different holding member which is spring pressed to move the locking member to its operative position and is moved to a released position by engaging a roller at its opposite end during separation of the tractor and trailer combination.
Fig. 13 is a horizontal cross sectional view taken on line 13—13 of Fig. 12 looking in the direction of the arrows illustrating the relationship between the locking element and a fifth wheel platform of the modified construction.
Fig. 14 is a longitudinal cross sectional view likewise similar to Fig. 4 showing a still further modified form of the invention and as illustrated in detail the coupling pin is moved to its locked or unlocked position independent of the coupling jaws during the coupling and uncoupling of the tractor trailer assembly.
Fig. 15 is a longitudinal cross sectional view similar to Fig. 14 showing a still further modified form of the invention wherein means is provided for locking the coupling element against accidental displacement when the tractor trailer assemblies are locked in coupled relation.

In Figures 12 and 13 there is shown a modified construction wherein the chassis frame 180 of the trailer is substantially identical to the chassis 16 shown in Figures 1 to 11, inclusive, and the turntable tiltable platform 181 is likewise of identical formation, and is carried by trunnion brackets 182 supported on a suitable tractor. The tiltable turntable 181 is provided with a slot extending from the rear end inwardly to the circular opening 183 for the reception of the coupling king pin and locking sleeve which will be described in full in the following paragraph. Coupling jaws 184 are pivotally supported on the underside of the tiltable platform 181 and are cut away as at 185 to provide complementary kingpin engaging faces for locking the kingpin in position. The coupling jaws 184 are similarly locked against separation by means of a sliding bolt 186 slidably positioned upon the boss 187 which has a reduced portion cooperating with a slot 188 in the bolt and a washer 190 held in place by a screw 191 to prevent displacement of the bolt. The opposite end of the bolt 186 is provided with a head 192 terminating in a reduced portion 193 so that a coil spring 194 may abut the downturned flange of the tiltable turntable to urge the head 192 and the bolt 186 into engagement with the jaws. The manual operating lever arm 195 is connected to the bolt by a suitable pivot pin 196 so that the latch bolt may be retracted to allow the separation of the jaws 184. A stirrup 197 extends beneath the jaws 184 and said jaws may be pivoted between the underside of the tiltable platform 181 and the stirrup 197 in the same manner as that shown in Figures 1 to 11, inclusive.

The front of the trailer 180 is provided with a rounded portion of channel iron construction and spaced thereupon is a transverse channel iron 199 having its ends welded or otherwise secured in place to the side portions of the chassis frame structure 180. A pair of longitudinally extending reenforcing bars 200 extend between the rounded portion 198 and the transverse channel bar 190 to provide a guideway for a slide plate 201 which is identical to the slide plate shown in Figure 9. The slide plate is supported by rollers 202 at each end thereof and the centralmost portion is provided with a tubular boss 203 in which is supported a kingpin retaining sleeve 204. The kingpin retaining sleeve is spaced from the circular boss 203 by oppositely disposed webs 205 thereby providing a circular space for receiving a locking sleeve 206. A kingpin 207 is threaded into the kingpin supporting sleeve 206 so that the lowermost end 208 will extend below the jaws 184 for engagement therewith.

The rollers 202 are adapted to engage the top surface of a wear plate 210 secured to the underside of the chassis frame 180 and said wear plate is provided with a slot 211 of a width sufficient to allow the passage of the locking sleeve 206 and kingpin 207. Guide bars 212 are riveted or otherwise secured to the parallel reenforcing bars 200 so that the top peripheries of the rollers 202 will be engaged by the inwardly-extending flanges 213 and thereby hold the sliding plate 201 in position.

One end of the slide plate 201 is provided with a boss 214 having extending transversely thereof a spindle shaft 215 on the ends of which are pivotally attached a pair of operating levers 216 adapted to straddle the locking sleeve 206 so that the slotted ends thereof may engage pivot pins 217 carried on the upper enlarged portions of said locking sleeve. Each of the locking sleeve operating levers 216 is provided with an offset portion 218 so that the free ends connecting the locking sleeve will rise abruptly and present an inclined surface 219. The opposite end of each of the levers 216 is provided with a tail portion 220 the underside of which is adapted to be engaged by a plunger 221 spring-pressed upwardly by means of a coil spring 222 located in a bore of a boss 223 formed on opposite sides of the slide plate. The spring-pressed plungers 221 are adapted to urge the tail 220 of each of the levers upwardly so as to normally force the locking sleeve 206 downwardly.

Extending across the parallel reenforcing bars 200 is a plate 224 having depending brackets 225 at each end thereof for supporting a spindle 226. Rotatably mounted on the spindle 226 is a roller 227 which is adapted to cooperate with the controlling levers 216 during the to and fro movement of the slide plate 201.

It is to be noted that in Figures 12 and 13, the circular opening 183 in the tiltable turntable 181 is of a different form than the circular opening 37 shown in the invention in Figures 1 to 11 inclusive. Certain coupling constructions are provided with one or the other types of opening and the invention in Figures 12 and 13 is intended for trailer construction wherein the tiltable turntable 181 is not provided with an enlarged king pin opening. Connected to the slide plate 201 is a slide rod 230 fastened in place by means of a pin 231 for the purpose of controlling the trailer prop in the same manner as is shown in Figures 1 to 11, inclusive. Guide rollers 232 are supported by the brackets 233 on the transverse channel frame bar 199 to guide the slide rod 230 during its reciprocating movement. The guide rod 230 extends into a circular opening formed in the enlarged boss 214 and projects between the integrally formed spring housing 223.

A locking bolt 234 is adapted to move into the path of the sliding plate 201, and said locking bolt is controlled by an operating lever 235 having a handpiece 236 similar to the locking bolt shown in Figures 1 to 11 inclusive.

*Operation of the form of the invention shown in Figures 12 and 13*

It will be assumed that the trailer structure shown in Figures 12 and 13 is in coupled relation and that the trailer is coupled to a tractor having a fifth wheel 181 provided with a fantail slot terminating in a rounded portion 183. When the tractor is coupled to a trailer in which this form of tiltable fifth wheel construction is employed, the locking sleeve 206 will be maintained elevated by engagement with the top surface of the tail portion of said fifth wheel construction and will remain in its elevated position regardless of the spring-pressed plunger 221. However, when the trailer is used or coupled with a tiltable fifth wheel construction having an enlarged slot or opening similar to the opening 37, the operation will be substantially the same as that shown in Figures 1 to 11 except that the plunger 221 will force the locking sleeve 206 downwardly into said opening during the locking position thereof and the tail 220 of each of the levers 216 will be held in its lowermost position by the roller 227 during the uncoupling of the tractor trailer so that the locking sleeve will be held positively elevated during the uncoupling position of the slide plate 201.

It is to be noted in the form of the invention shown in Figure 12 having a turntable 181, the sleeve 206 will not be lowered and there is no safety locking feature provided by reason of the fact that the locking sleeve 206 is maintained in an elevated position by engagement with the top surface of the tiltable fifth wheel platform 181. By simply releasing the bolts 234 and 186, the slide plate 201 may be moved forwardly so as to operate the rod 230 and lower the trailer prop whereupon the jaws 184 are free and may likewise be released so that continued movement of the tractor and trailer will eventually separate the same.

*Detailed description of modified form of invention shown in Fig. 14*

In this embodiment of the invention the trailer chassis frame 237 is substantially identical to the other forms and said chassis is constructed of a channel-shaped pair of angle bars connected by a rounded portion 238 in the front thereof. A channel-shaped transverse spring bar 239 is welded into position and extending between the rounded portions 238 and 239 is a pair of parallel reenforcing channel irons 240. A wear plate 241 is fastened to the underside of the chassis and is provided with an elongated slot 242 extending longitudinally thereof. The tiltable fifth wheel platform is identical to the platform shown in Figures 12 and 13 and is supported by spaced trunnions 244 which pivotally engage suitable pins 245 carried by a bracket 246 depending from the underside of the tiltable fifth wheel 243. The tiltable fifth wheel 243 is provided with a fantail slot 247 terminating at its inner end in a rounded portion 248. Extending beneath the rounded portion of said slot is a stirrup 249 so that coupling jaws 250 may be pivotally mounted therebetween. Each of the coupling jaws is provided with a complementary coupling portion 251 and is notched as at 252 for receiving a sliding bolt 253 having a slot 254 so that the bolt may be slidably supported upon the reduced portion of a depending boss 255. A washer 256 is held in place by a screw 257 to prevent displacement of said bolt and one end of said bolt is enlarged as at 258 so that a guide rod 259 may be formed integral therewith. The guide rod 259 extends through an opening in the marginal flange of the fifth wheel 294 and a coil spring 260 encircles the guide 259 to normally urge the sliding bolt 253 toward the coupling jaws 250. The operating lever 261 is coupled to the bolt by a suitable pivot pin similar to that shown in the prior construction.

Slidably mounted between the reenforcing bars 240 is a slide plate 262 supported by wheels 263 at each end thereof. The slide plate is further guided by angle bars 264 so that the flanges thereof will engage the rollers 263 and prevent the displacement of the slide plate.

The rear portion of the slide plate is provided with an enlarged boss 265 having a circular opening for receiving a slide rod 266 and said slide rod is held in position by a pin or key 267. The centralmost portion of the slide plate is provided with a tubular boss 268 which is formed integral with the slide plate and is provided with a depending portion 269 projecting downwardly below the slide plate and extending through the slot 242. Slidably mounted in the bore 270 of the annular boss 268 is a kingpin 271 the lower headed end of which as at 272 is adapted to engage when in a lower position the stirrup 249 and be limited against rearward movement by an upturned nose portion 273 thereon. It is to be noted that the stirrup 249 is spaced a sufficient distance to allow the head 272 to override the nose 273 when the kingpin 271 is elevated so as to provide sufficient clearance between the jaws 250 and the top edge of said nose 273.

The upper end of the kingpin 271 is threaded and is provided with a collar 274 having oppositely extending pins 275 for being operably received in the slotted ends of a pair of control levers 276. The control levers are pivoted to a spindle 277 extending through the enlarged boss 265 and each of the levers 276 is provided with an upwardly inclined tail portion 278. Extending across the parallel frame bars 240 is a plate 279 from which depends a pair of bearing brackets 280 suitably fastened in place by bolts or the like. A spindle 281 is mounted between the brackets 280 for supporting a roller 282 which is adapted to cooperate and engage the levers 276 so as to raise and lower the kingpin 271 during the coupling and uncoupling operations. A slide plate locking bolt 283 is projected into the path of the slide plate and may be retracted by means of an operating lever 284 having a handpiece 285. The slide rod 266 extends between grooved rollers 286 supported by a suitable bracket 287 welded or otherwise fastened to the transverse channel frame member 239 so as to guide the slide rod in its to and fro movement.

*Operation of the form of the invention shown in Figure 14*

In the second modified form of the invention, as is clearly illustrated in Figure 14, it will be noted that the locking sleeve is omitted and that the kingpin 271 is capable of reciprocation when the slide plate 262 is moved to and fro by manipulating the tractor. It is also to be noted that the construction shown is of the type particularly intended for use in connection with tractors having tiltable fifth wheel platforms in which the fantail slot for the entrance of the kingpin terminates in a rounded portion of a diameter equal to the width of the slot. In operation, with the parts as shown in Figure 14, the tractor and trailer are completely coupled and the trailer props controlled by the slide rod 266 are elevated. Should it be desired to uncouple the tractor-trailer combination, the bolts 283 and 253 are released and the tractor is moved forward to allow the slide plate 262 to move forward so that the end of the lever 276 as at 278 will be presented beneath the roller 282 whereupon the kingpin 271 will be elevated a sufficient distance so that the head 272 thereof will clear the nose 273 on the stirrup 249. When this action occurs, the slide rod 266 is moved forwardly with the slide plate 262 so that the trailer props will be lowered and the trailer will be properly supported. After operating the bolt 253 by the lever 261 to withdraw the latch bolt, the jaws 250 may be allowed to separate upon continued forward movement of the tractor whereupon the annular boss 269 and kingpin 271 will travel rearwardly of the fantail slot in the tiltable fifth wheel platform 247. To couple the tractor and trailer combination, the tractor is first moved so that the tiltable fifth wheel 247 is beneath the wear plate 241 so that the jaws 250 will engage the kingpin 271 and upon continued rearward movement of the tractor the slide plate 262 will move a predetermined length determined by the slot 242 so that the roller 282 will force the kingpin 271 downwardly into locking engagement with the nose 273. When the slide plate 262 has thus been returned the bolts 283 and 253 project into the path of the slide plate and jaws respectively, whereupon the tractor and trailer will be coupled for draft purposes.

*Third modified form of the invention shown in Figure 15*

In the modified construction shown in Figure 15, the tiltable platform 288 is adapted to be carried by the rear portion of the tractor and is provided with downwardly depending webs 289 adapted to be pivoted to upwardly extending webs 290 by suitable trunnion bearings 291. The tiltable fifth wheel 288 is constructed in substantially the same manner as the fifth wheel shown in Figures 12 and 14, and generally comprises a fantail slot 292 terminating at its inward end in a curved portion 293. The marginal edge and slot 292 are flanged as at 292a to add rigidity to the construction.

Extending beneath the curved portion 293 of the fantail slot is a stirrup 294 the ends of which are formed integral with the fifth wheel platform 288 and it is to be noted that in this form of the invention, the stirrup 294 is of an increased width and is provided at one end with an enlarged portion 295 providing angularly arranged cam faces 296 and 297.

The trailer chassis frame is of channel formation and comprises side frame members 298 connected at the front by a curved portion 299. Extending between the curved portion 299 and a channel-shaped transverse frame member 300 is a pair of parallel longitudinally extending channel-shaped bars 301 the ends of which may be suitably welded or otherwise fastened in place.

Slidably positioned between the parallel bars 301 is a slide plate 302 supported at each end by a pair of wheels 303 which ride upon the top urface of a wear plate 304 welded or otherwise fastened to the underside and front portion of the chassis frame 299. Fastened to the opposed surfaces of the parallel bars 301 is an angle iron 305 secured by suitable rivets so that the flanges 307 thereof will extend over the rollers 303 and prevent vertical displacement of the slide plate 302. The slide plate 302 is formed similar to the slide plate 262 and is provided with a central tubular boss 308 having an extended portion 309 adapted to project downwardly and travel in a slot 310 formed in the wear plate 304. The downwardly depending tubular boss 309 also projects into the rounded portion 293 of the tiltable fifth wheel 288 and is adapted to be guided thereinto during the coupling by being received within the fantailed slot 292. Reciprocably mounted within the tubular boss 308 is a kingpin 311 which projects a considerable distance below the depending boss 309 and is provided with an enlarged head 312 adapted to extend a short distance from the stirrup 294.

Pivotally mounted between the stirrup 294 and the under side of the tiltable fifth wheel 288 is a pair of kingpin engaging jaws 313 mounted on suitable pivots (not shown) and each of the jaws 313 is provided with a complementary cutaway portion 314 to encircle the lower end of the kingpin 311. Each of the jaws 313 is notched as at 315 for receiving one end of a latch bolt 316 having an intermediate longitudinal slot 317 for being slidably received upon the reduced portion 318 of a boss 319 depending from the underside of the tiltable fifth wheel 288. A washer 320 is fastened in place by means of a machine screw 321 to prevent displacement of the latch bolt 316 and one end of the latch bolt 316 is provided with a shaft portion 322 slidable in an opening in the flange 294 to further guide and control the latch bar. A coil spring 323 encircles the shaft portion 322 so that one end will engage the latch bar and the opposite end will abut the flange 294 thereby projecting the latch bolt 316 between the notches 315 and retaining the coupling jaws 313 in engagement with the kingpin 311.

The upper end of the kingpin 311 is screw-threaded and is adapted to receive a threaded collar 324 having oppositely disposed operating pins 325. In addition to providing operating means for the kingpin 311, the collar 324 limits the downward movement of the kingpin so that the head 312 thereof will slide freely on the stirrup 294 for a portion of its length.

Formed integral with the slide 302 at one end thereof is an enlarged boss 326 which carries a spindle 327 on each end of which is pivoted a control lever 328. One end of each of the control levers 328 is slotted for receiving the oppositely disposed pins 325 on the threaded collar 324 and the opposite end of each of the control levers 328 is provided with a tail portion 329 which is urged upwardly by means of a spring-pressed plunger 330. The spring-pressed plunger 330 is slidably mounted in a housing 331 in which is located a coil spring 332 and said plunger housings 331 are each formed integral with one end of the slide plate 302. Also formed in the slide plate boss 326 is a cylindrical opening 333 for receiving a slide rod 334 which is held in place by a transversely extending pin 335 sweated or otherwise fastened in position. The slide rod 334 is adapted to be guided by suitable grooved guide rollers 336 supported by a bracket 337 on the transverse channel frame bar 300 so that an opening therein as at 338 will aline with an opening 339 in the bracket. Extending between the parallel reenforcing bars 301 is a plate 340 having adjacent each end bearing brackets 341 depending therefrom for supporting a transverse shaft 342. A roller 343 is rotatably mounted on the shaft and is adapted to cooperate with the control lever 338 to rock the same about their pivot 327 when the slide plate 302 is reciprocated to and fro thereunder. A locking bolt 344 is slidably mounted in one of the parallel reenforcing bars 301 so as to project into the path of the slide plate 302 and an operating bar 345 is coupled with the bolt 344 and terminates in a handpiece 346 which may be grasped by the operator for the purpose of retracting the spring-pressed bolt 344. Likewise, an operating lever 347 is connected to the latch bolt 316 by means of a pivot pin 348 for manually retracting the bolt 316 against the action of the coil spring 323.

*Operation of the form of the invention shown in Figure 15*

As shown, the tractor and trailer are in coupled relation and are in complete draft engagement. The kingpin 311 is locked by the jaws 313 and the head 312 of the kingpin is maintained in its lowermost position by means of the location of the slide plate 302 so as to position the roller 343 above the axis of the kingpin. Should it be desired to uncouple the tractor and trailer combination, the bolts 316 and 344 are retracted by manipulating the lever 347 and handpiece 346 whereupon the driver may move the tractor forwardly so that the slide plate 302 will travel the length of the slot 310. As this action occurs, the roller 343 rides over the levers 338 until the tails 329 are positioned beneath the roller 343. After the slide plate 302 has thus been moved, continued movement of the tractor will allow the kingpin 311 and head 312 to ride rearwardly and upwardly over the cam surface 396. Simultaneously, the operating rod 334 will be moved forwardly partly under the action of the prop projecting spring, with respect to the trailer and will properly lower the trailer props so that the front end of the trailer will be supported thereby. The tractor-trailer combination is then separated and the trailer will be supported by said props.

During the coupling operation, the tractor is moved rearwardly so that the kingpin 311 and tubular depending boss 309 will ride into the fantail slot 292 whereupon the head 312 of the kingpin will engage and ride over the cam surface 297 and will slide downwardly over the cam surface 296 and will finally come to rest in position for being engaged by the jaws 313. And upon further rearward movement of the tractor, the slide plates 302 will likewise move rearwardly and will position the roller 343 above the kingpin and will simultaneously operate the reciprocating control rod 334 to elevate the trailer props. After the slide plate 302 has been moved rearwardly a sufficient distance, the bolt 344 is projected into the path thereof by spring means so as to maintain the tractor and trailer in draft engagement; likewise, the jaws 315 will be held in engagement with the kingpin 311 by the projection of the bolt 317.

While a specific embodiment of the invention has been described and illustrated, it will be understood that various modifications may be made within the scope of the appended claims without departing from the spirit of the invention.

What I claim is:

1. A tractor-trailer combination comprising a vehicle, a trailer adapted to be connected to the vehicle, component coupling elements carried by the vehicle and tractor for maintaining the trailer in draft engagement with the vehicle, a trailer supporting prop carried by the trailer, a locking sleeve carried by one of the component coupling elements, and shiftable means supporting one of the component coupling elements operable by the to and fro movement of the vehicle for simultaneously controlling the locking sleeve and trailer supporting prop.

2. A tractor-trailer assembly comprising a draft vehicle, a trailer adapted to be connected to the vehicle, component coupling elements for maintaining the vehicle and trailer in draft engagement, a trailer supporting prop carried by the trailer adapted to be lowered when the trailer is disconnected from the vehicle, a slide member supporting one of the component coupling elements, means controlled by the slide member for lowering the trailer prop and a locking member axially movable relative to one of said component coupling elements and carried by the slide member adapted to move into and out of engagement with a portion of the other component coupling element.

3. A tractor-trailer combination comprising a vehicle, a trailer coupled to the vehicle, a slide mounted on the trailer for movement in opposite directions, a coupling pin carried by the slide, a fifth wheel platform carried by the vehicle, coupling pin engaging jaws carried by the platform, an extensible and retractible trailer prop controlled by the movement of the slide and a sleeve carried by the coupling pin and engageable in a slot in the fifth wheel platform, said sleeve being operable by the movement of the slide in one direction to lock the vehicle and tractor in draft engagement and operable upon movement of said slide in the other direction to release said sleeve and project said trailer prop.

4. A tractor-trailer combination comprising a vehicle, a trailer connected to the vehicle, a slide mounted on the trailer adjacent the trailer connection movable in opposite directions, an extensible trailer prop for supporting the trailer when uncoupled from the vehicle, control mechanism connecting said slide and prop, and separable locking sleeve means connecting the slide with the vehicle whereby forward motion of the vehicle during uncoupling will cause the slide to move in one of said directions and lower the trailer prop and simultaneously release said separable locking sleeve means.

5. A tractor-trailer combination comprising a vehicle, a trailer adapted to be connected to the vehicle, component coupling elements for maintaining the vehicle and trailer in draft relationship, a slide carried by the trailer for supporting one of the component coupling elements, an extensible trailer prop operably connected to the slide whereby movement of the slide will cause the raising and lowering of the trailer prop, latch means associated with one of the component coupling elements for locking the slide against movement and locking means associated with the component coupling element carried by said slide movable axially with respect to the other component coupling element.

6. A combination vehicle structure comprising a tractor, a trailer, component coupling elements for maintaining the tractor and trailer in draft engagement, a projectable trailer prop structure for the front of the trailer, locking means carried by one of the component coupling elements and independently operable therefrom for locking the component coupling elements against accidental displacement, a slide means supporting one of the coupling elements and said locking means, means operable for simultaneously lowering the prop structure and unlocking the component coupling locking means and latch means for said slide whereby operation of said latch means prior to the separation of said component coupling elements will permit lowering of said prop structure.

7. A combination vehicle comprising a tractor and a trailer, component coupling elements for maintaining the tractor and trailer in draft engagement, a prop means carried by the trailer movable to one position for supporting the trailer and retractible to its other position during draft engagement of the tractor and trailer, means for locking the tractor and trailer against accidental separation during draft relationship, and shiftable means supporting one of the component coupling elements operable to simultaneously control the locking means and the movement of the trailer prop means to one of said positions.

8. A combination vehicle comprising a tractor and trailer adapted to be coupled in draft engagement, component coupling elements for the tractor and trailer, one of said coupling elements being supported for horizontal shifting movement, a trailer prop adapted to be raised and lowered by the shifting movement of said component coupling element and a locking sleeve slidably mounted on one of said component coupling elements operable simultaneously with the operation of said trailer prop.

9. A tractor-trailer combination comprising a vehicle, a trailer, component coupling elements for connecting the trailer to the vehicle, a slide supporting one of said coupling elements, a trailer prop for supporting the trailer when uncoupled from the vehicle, means connecting the prop and slide whereby movement of the slide will effect the movement of the prop to and from ground engaging position, a locking sleeve carried by the slide adapted to lock the coupling elements against accidental separation, means carried by the slide for controlling the movement of the sleeve and means cooperable with the slide to hold the locking sleeve in its operative position.

10. A tractor-trailer combination comprising a vehicle, a trailer, component coupling elements for connecting the trailer to the vehicle in draft relationship, a protectable trailer supporting prop carried by the trailer, a slide mounted on the trailer operably connected to the prop whereby reciprocating movement of the slide will move the prop into and out of ground engaging position, and a locking element carried by the slide and associated with one of said component coupling elements adapted to lock the component coupling elements against accidental displacement, and means carried by the slide for controlling movement of the locking element.

11. A tractor-trailer combination comprising a vehicle, a trailer adapted to be connected to the vehicle, component coupling elements for maintaining the trailer in draft relationship with the vehicle, a trailer supporting prop carried by the trailer, a slide mounted on the trailer movable in two directions and operably connected to the prop, one of said coupling elements being supported and suspended from the slide, means for locking the slide against longitudinal movement and a locking sleeve associated with the coupling element on said slide and operable upon movement of the slide in one of said directions to hold the coupling element on the slide against accidental displacement.

12. A tractor-trailer combination comprising a vehicle, a trailer adapted to be connected to the vehicle, a coupling element carried by the vehicle, a slide mounted on the trailer, a movable coupling pin carried by the slide for being engaged by the first-mentioned coupling element, a trailer prop adapted to be raised and lowered into and out of ground engaging position, means operably connecting the slide and prop and means cooperating with the slide upon movement thereof to lock the coupling pin against accidental movement when the trailer prop is elevated and to unlock and permit movement of said coupling pin when the prop is in its lowered position.

13. A tractor-trailer combination comprising component coupling elements for maintaining the tractor and trailer in draft engagement, a two-part prop having an extensible trailer supporting leg portion carried by the trailer rearwardly of the coupling elements, a latch member carried by the leg portion for holding the leg portion of the two-part prop extended when under a load, and means for raising and lowering said prop and simultaneously controlling the latch member.

14. A tractor-trailer combination comprising component coupling elements for maintaining the tractor and trailer in draft engagement, a prop mounted on the trailer adapted to be extended to support the trailer when disconnected from the tractor, a latch carried by the prop for holding the same extended, a rod extending through the prop having one end engaging the latch, said rod, latch and prop being adapted to be moved downwardly and means controlled by the coupling and uncoupling of the component coupling elements for controlling said rod.

SIDNEY B. WINN.